(12) United States Patent
Smith

(10) Patent No.: US 6,708,837 B2
(45) Date of Patent: Mar. 23, 2004

(54) LOCKING SYSTEM AND METHOD FOR ROTARY CLOSURE ASSEMBLY

(75) Inventor: Brian Smith, Woodsetts Worksop (GB)

(73) Assignee: General Signal UK Limited, Stockport (GB)

( * ) Notice: Subject to any disclaimer, the term of this patent is extended or adjusted under 35 U.S.C. 154(b) by 136 days.

(21) Appl. No.: 10/073,206

(22) Filed: Feb. 13, 2002

(65) Prior Publication Data

US 2002/0117502 A1 Aug. 29, 2002

(51) Int. Cl.[7] ............................................. B65D 45/00
(52) U.S. Cl. ........................................ 220/316; 220/293
(58) Field of Search ................................ 220/316, 315, 220/293–303

(56) References Cited

U.S. PATENT DOCUMENTS

| | | | | | |
|---|---|---|---|---|---|
| 2,869,752 A | * | 1/1959 | Hall | ........................... | 220/298 |
| 4,139,118 A | * | 2/1979 | Parker | ........................ | 220/316 |
| 4,367,823 A | * | 1/1983 | Raver | ......................... | 220/316 |
| 4,465,202 A | * | 8/1984 | Stoves et al. | ................ | 220/316 |
| 4,515,287 A | * | 5/1985 | Baudoux et al. | ............ | 220/316 |
| 4,750,635 A | * | 6/1988 | Piegza et al. | ............... | 220/316 |
| 6,067,896 A | * | 5/2000 | Elorza | ........................ | 220/316 |
| 6,523,459 B1 | * | 2/2003 | Chameroy et al. | .......... | 220/316 |

OTHER PUBLICATIONS

"MODCO Pipeline Hinged Closures" Brochure, MODCO Industries, Incorporated, P.O. Box 657 Conroe, Texas 77305, pp. 1–3.
"Press Interlock Technical Papers", Scholz & Co., Scholz-Verschlüsse Brochure, pp. 1–8.
"Press Interlock Technical Papers", Scholz & Co., Scholz-Verschlüsse Brochure, pp. 1–8.

* cited by examiner

Primary Examiner—Nathan J. Newhouse
(74) Attorney, Agent, or Firm—Baker & Hostetler LLP

(57) ABSTRACT

A system and method is provided for locking a lug-type rotary closure assembly in a closed position. The locking arrangement includes a pressure warning device, which may also release internal pressure. The system cannot be unlocked and hence the closure cannot be opened, until the pressure warning device has been moved to a position where it will warn of internal pressure and/or release internal pressure.

18 Claims, 6 Drawing Sheets

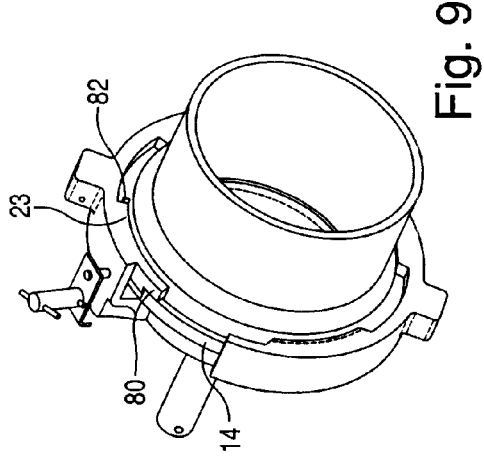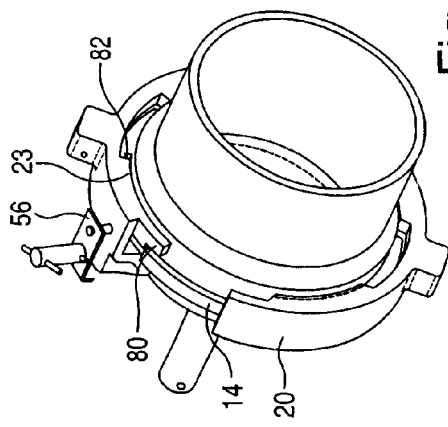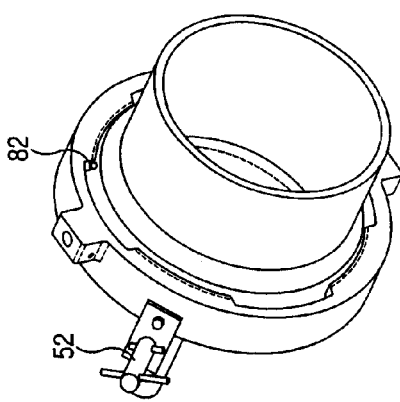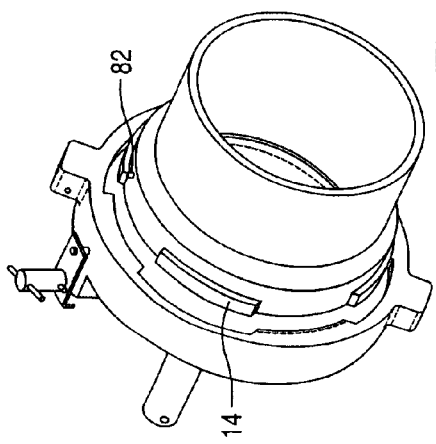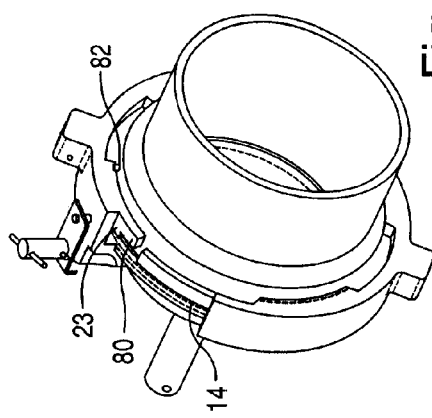

LOCKING SYSTEM AND METHOD FOR ROTARY CLOSURE ASSEMBLY

FIELD OF THE INVENTION

The present invention relates generally to locking systems and methods for rotary closure assemblies. More particularly, the present invention relates to a locking closure system and method for a lug type locking arrangement that includes a pressure warning release screw device.

BACKGROUND OF THE INVENTION

In fluid or gas handling systems in industry, particularly pressurized systems, it is known to provide a so-called closure assembly to provide quick and safe access into some part of the interior of the fluid or gas handling system. For example, in the gas and/or chemical industries, it is common for there to be various pipelines and vessels that generally operate in a pressurized environment. When the systems are not in operation, it is often desirable to have access to the inside of the systems for cleaning, inspection, and/or the changing of filters or other replaceable elements which may be present.

Some applications of closure systems include those in the petrochemical, pharmaceutical and chemical process industries such as blow downs, manways, meter provers, filters, strainers, coalescers, waste disposal vessels, and autoclaves. Typical closures may for example range in diameter from 4 inches to 24 inches, with working pressures up to ANSI 300 (740 psi/51.1 bar) and temperatures from −50 degrees F. to 400 degrees F.

One approach to providing a closure is to provide a flange around an opening at the end of a hub-shaped extension that extends from some part of the fluid handling system. A covering or closing element, which forms a cap often referred to as a head, and which may simply be a disk shape or a dome-shaped piece of material, is removably but securely attached over the flanged opening to provide a fluid-tight and pressure-tight seal when closed. The cover is removable to provide access to the interior of the pressurized system via the opening in the flange.

One way of securing the cover element, or closure, onto the flanged opening has been simply to provide a series of corresponding bolt holes through the cover and around the circumference of the flange so that individual bolts may be inserted through the corresponding holes and tightened. Tightening the bolts presses the circumference of the closure against the flange, and a sealing element such as a gasket may be provided between the closure and the flange. Tightening all the bolts provides closing pressure and a seal at the gasket to resist escaping of the fluid or gas daring system operation. A disadvantage of these bolt type closures is that individually installing and/or removing bolts can be time consuming and cumbersome, particularly where a large number of bolts are required.

Another type of closure is the so-called screw type of closure, in which the flange has a threaded outer surface, and the closing element is shaped like a cap and has a corresponding threaded inner surface. This closure is screwed onto the flange to provide a seal. A disadvantage of screw type closures is that closing the cap usually requires that the cap be rotated many degrees, even several rotations.

A third type of closure is the so-called rotary lug type closure. In this arrangement, the outer circumference of the flange has several lugs projecting outwardly, and the cover or head has grooves and corresponding lugs projecting inwardly. Thus, the head can be oriented at an angle where it can be pushed axially onto the flange. The head can be rotated a specified number of degrees so that the lugs interfere with each other and prevent the head from moving axially. In this arrangement, once the head has been rotated so that the lugs are fully interfering, the head is held pressure-tight against the flange, to resist leakage and pressure.

Lug type rotary systems can be preferable to screw type systems because the cover can be moved from a fully openable to a fully closed position merely by rotating the cover by a partial turn, e.g., by 45 degrees. This can be a more simple operation than the many rotations sometimes required on a screw type closure.

Industrial systems often handle fluids and/or gases at very high pressures. Before accessing these systems via a closure, it is generally known to depressurize the system by means of a main bleed valve located somewhere in the system. It is be desirable to have a safety device to prevent opening of these closures where significant pressure exists inside the system, for example as would occur if the main bleed valve operation has not been performed. Since these systems sometimes have residual pressures even after the main bleed process has been performed, it can also be desirable for the closure to have some type of safety device to prevent opening of the closure even when a residual internal pressure is present. It may sometimes also desirable to have some arrangement for bleeding out these residual pressures at the location of the closure, so that pressure at the closure can first be bled out, and then opening of the closure can be effected, all at the location of the closure. Thus, there is a need for a system and method that (1) provides a warning to the operator of full and/or residual pressure and/or (2) releases pressure in the region of closure, before the closure can be opened.

SUMMARY OF THE INVENTION

It is therefor a feature and advantage of the present invention to provide a system and method that (1) provides a notification to the operator of full and/or residual pressure, and/or (2) releases pressure in the region of closure, before the closure can be opened. The above and other features and advantages are achieved through the use of a novel system and method as herein disclosed. In accordance with one embodiment of the present invention, an apparatus for locking a closure assembly in a closed position has a hub having an opening therethrough; at least one hub lug projecting from the hub; and a head having at least one hub lug projecting therefrom. The head is rotatable between an unlocked position where the lugs do not interfere with each other and the head may be removed from the hub, and a closed position where the lugs at least partially overlap each other and interfere with each other so that the head is held in a sealing engagement with the hub. A vent bore passes through at least one of the head and the hub; and a first locking bore passes through the head. A second locking bore extends at least partially into the hub and is aligned with the first locking bore when the head is in the closed position. A seal and lock device includes a sealing element that releasably seals the vent bore and a projection that projects into the first and second bores when the head is in the closed position and the sealing element is sealing the vent bore.

In another aspect the invention provides a releaseable locking element movable between a locked position that locks the head in a closed position and an unlocked position. A pressure warning device is movable between a sealed position and a warning position and is operably connected to the locking element so that the pressure warning device must be in a warning position in order for the locking element to be unlocked.

In another aspect, the invention provides a releaseable locking element moveable between a locked position which locks the head in a closed position, and an unlocked position. A pressure warning means is moveable between a sealed position and a warning position, and is operably connected to the locking means so that the pressure warning means must be in a warning position in order for the locking means to be unlocked.

A method for locking a closure assembly in a closed position for use with a hub having an opening therethrough and a head removably attachable to the hub via a lug-type holding arrangement. The method includes moving a pressure warning/release device from a sealed position to a warning position, the warning/release device operably connected to a locking device that operates to withdraw a projection from the lug-type holding arrangement, so that the pressure warning/release device must be in a warning position in order for the locking device to be unlocked.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 is a perspective view of the closure, with the door in a fully closed position.

FIG. 8 is a perspective view of the arrangement of FIG. 6, with the door rotated to a first position.

FIG. 9 is a perspective view with the door rotated to the first position and moved outward axially.

FIG. 10 is a perspective view showing the door rotated to a second position.

FIG. 11 is a perspective view showing the door rotated to the second position of FIG. 9 and also pulled outward axially into an open position.

DETAILED DESCRIPTION OF PREFERRED EMBODIMENTS OF THE INVENTION

The present invention in some embodiments provides a system and method that (1) provides a notification to the operator of full and/or residual pressure and/or (2) releases pressure in the region of closure, before the closure can be opened.

A system and method is provided for locking a lug-type rotary closure assembly in a closed position. The locking arrangement includes a pressure warning device, which may also release internal pressure. The system cannot be unlocked and hence the closure cannot be opened, until the pressure warning device has been moved to a position where it will warn of internal pressure.

Figure 1:
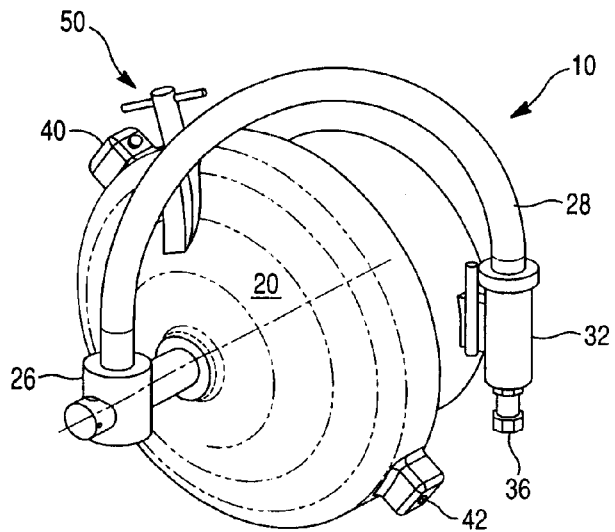
FIG. 1 is a perspective view of a closure assembly according to a preferred embodiment of the present invention.
Figure 2:
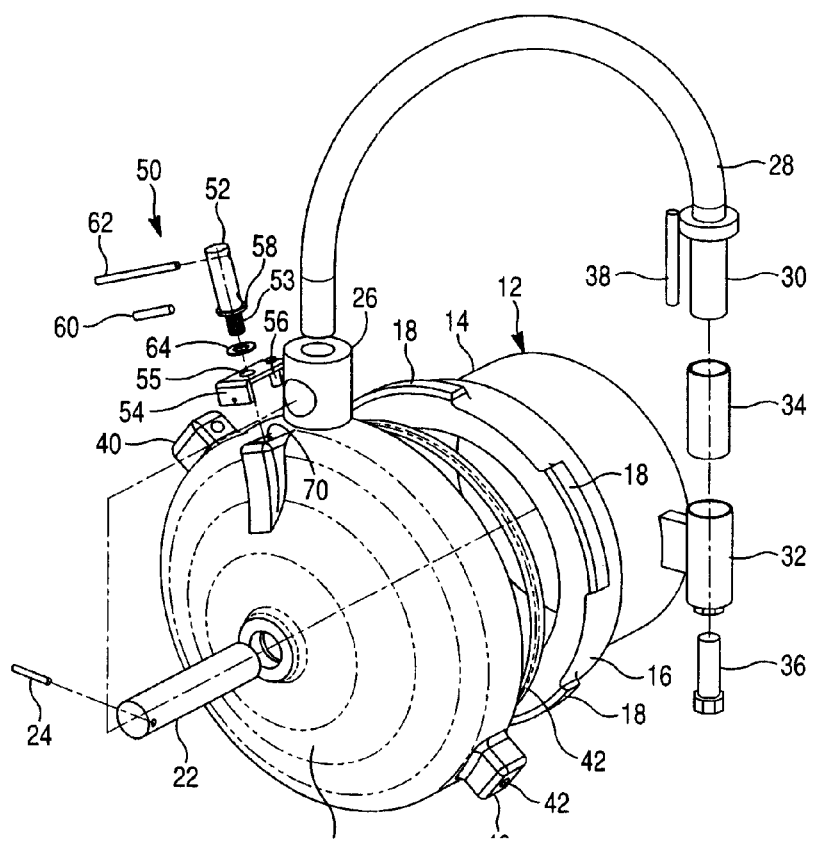
FIG. 2 is an exploded view of the assembly of FIG. 1.

As seen especially in FIGS. 1 and 2, the invention provides a closure assembly 10. A connector 12 has a hub or flange 14 that provides an opening through the connector 12 into the interior of a fluid or gas handling system. The flange 14 has an outer circumference 16 with a plurality of outwardly projecting arcuate lugs 18. The projecting lugs 18 are preferably equal in length and spaced at even arcuate intervals. However, in some circumstances it may be desirable to vary the length and/or spacing of the lugs 18.

A head or cover 20 is hingedly mounted to the flange 14 in such a way that it is rotatable relative to the flange 14 about the center axis of the flange 14. The head 20 also is movable generally axially versus the flange 14 into a closed position where it seals with the flange 14, and an open position where it is out of the way and access through the opening in the flange 14 is provided.

In one preferred embodiment, hinged mounting of the head 20 is provided by a guide bar 22 and a pin 24 that secures the guide bar to a davit boss 26 connected to a davit arm 28. The davit arm 28 has a hinge pin 30 that can rotate within a neck assembly 32 mounted to the pipe section 12 via a bushing 34. An adjustor bolt 36 may be provided to provide compression to frictionally hold the hinge at a specific angular position, and an arm stop 38 may be provided to restrict the range of hinge motion.

The head 20 may also include a pair of hand grip projections 40, which allow the user to manually rotate the head 20. Although two projections are illustrated, the number and position of grips can vary and other handgrips can be provided. The projections 40 may include a bore or other tool-receiving portion that can receive a tool to provide additional leverage to rotate the head 20. The head 20 also has a flange 21 with a plurality of inwardly projecting arcuate lugs 23 (see FIGS. 5 and 6).

The basic interaction of the head 20 with the flange 14 is that the head 20 is rotated to a first, free, position where the lugs 18 on the flange 14 are at different angular positions from the lugs 23 on the head 20, and the lugs 18 and 23 do not interfere with each other. In this first free or open position, the head 20 can be freely moved axially off of the flange 14, and can also be manually urged forward against the flange 14. FIGS. 1 through 6 illustrate a first embodiment. Another embodiment having a variation on the lugs is illustrated in FIGS. 7 through 11 and described below.

Returning to FIGS. 1 through 6, a seal 42 may be provided where the head 20 would contact the front surface of the flange 14 when the head 20 is closed. In the preferred embodiment, the seal is attached the inwardly facing surface of the head 20, which helps protect the seal 42 from damage. However the seal 42 may alternately be attached to the outwardly facing surface of the flange 14.

When the head is in the first rotary position, but has been urged axially against the flange 14 with a sufficient degree of pressure, so that the lugs 18 clear the lugs 23 in the axial direction, then it is possible to rotate the head 20 so that the lugs 23 of the head 20 rotate behind the lugs 18, providing an interference that retains the head 20 onto the flange 14. This provides positive closure of the head 20. The head 20 can be opened and removed by reversing the steps described above. It will be appreciated from the above that the lugs 18 and 23 serve as holding elements that hold the head 20 on the flange 14, and can provide a positive pressure seal.

Turning now especially to FIGS. 1, 2, 5 and 6, the invention in preferred embodiments also includes a combined locking and pressure warning/release assembly 50. The combined locking and pressure warning/release assembly 50 includes a pressure warning/release screw 52 that is inserted through a deflector plate 54. The deflector plate 54 includes integrally therewith a locking pin 56. In the preferred embodiment, the deflector plate 54 is an L-shaped metal bracket with a bore 55 therethrough for receiving the pressure warning release screw 52. The deflector plate 54 also has an integral locking pin 56 projecting therefrom as shown.

The pressure warning/release screw 52 has a lower flange 58 that is larger than the bore in the deflector plate 54, so that the pressure warning/release screw 52 is held in axial position with respect to the deflector plate 54. A pin 60 also assists with retaining the release screw 52 in the plate 54, so that when fully assembled the pressure warning/release screw 52 can rotate in the bore 55 in the deflector plate 54, but cannot move axially with respect to the deflector plate 54. When the pressure warning release screw 52 is moved axially up and down, the deflector plate 54 necessarily moves up and down together with it. A bar 62 can be inserted through the top of the pressure warning release screw 52 to facilitate manual rotation of the screw 52, and a dowty seal 64 can be provided under the flange 58 to provide sealing as described in more detail below.

Figure 3:
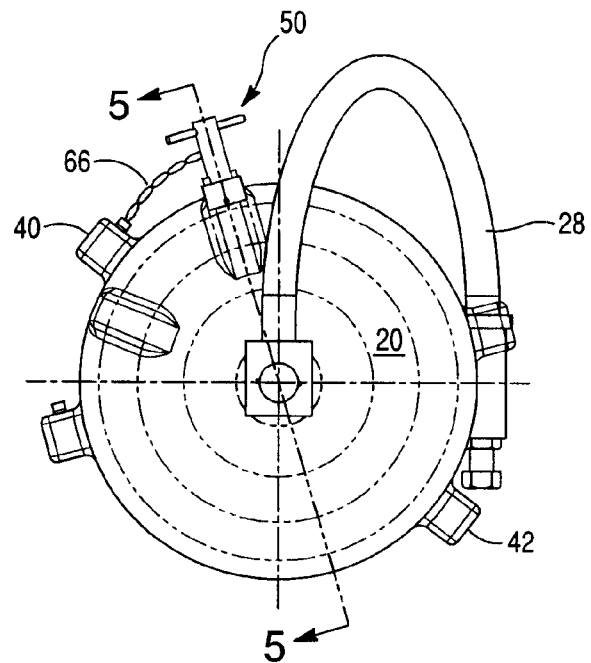
FIG. 3 is a front view of the assembly.
Figure 4:
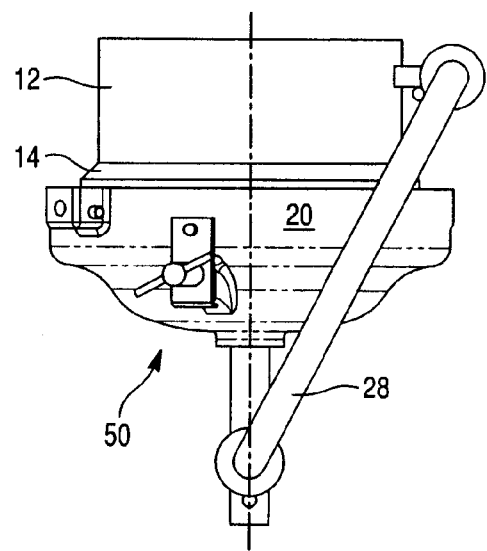
FIG. 4 is a top view of the assembly.

FIG. 3 illustrates a chain or other retaining strap 66 that may be provided to prevent loss or misplacement of the screw 52 when it is completely unscrewed and removed from the head 20. When the screw 52 and deflector plate 54 are assembled together, they cannot be disassembled without removing the pin 60, and thus the chain or restraining strap 66 provides a keeper device for the combined pressure warning/release and locking arrangement 50.

Figure 6:
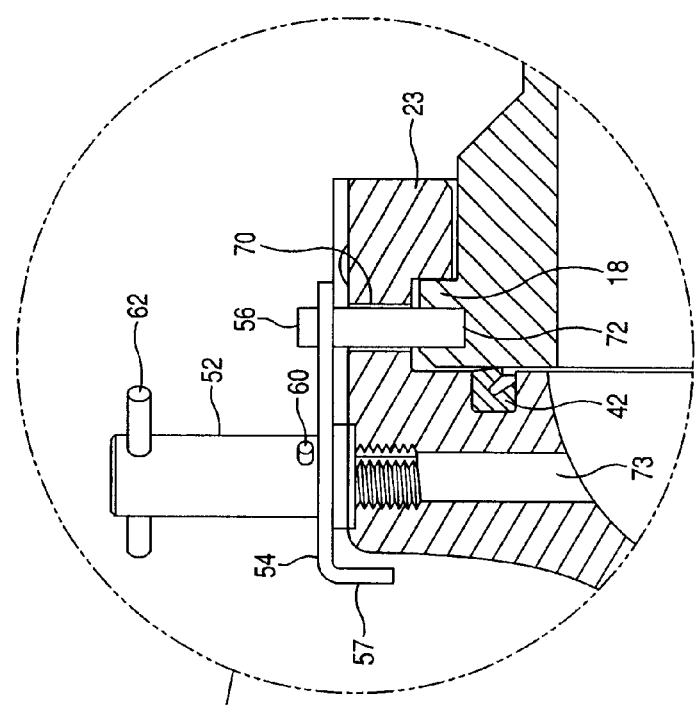
FIG. 6 is a detailed cross sectional view of a portion of FIG. 5A.
Figure 5:
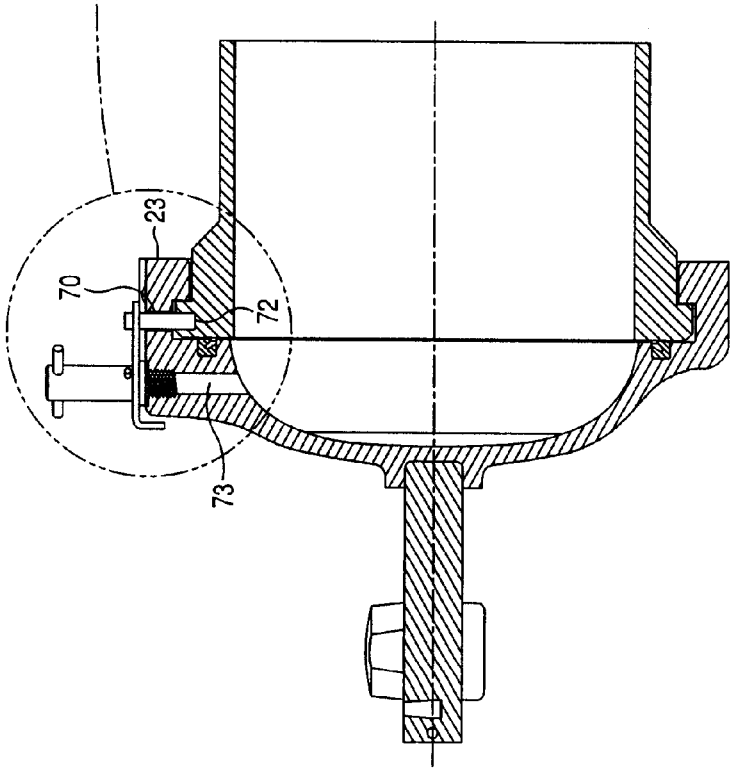
FIG. 5 is a cross sectional view of the assembly in a closed position, taken through line 5—5 of FIG. 3.

Turning particularly to FIGS. 5 and 6, it can be seen that when the head 20 and is in the fully closed position, a bore 70 that extends through the head 20 is aligned with a bore 72 that extends partially into the flange 14. In the illustrated example, the bore 72 extends into a lug 18 of the flange. The bores 70 and 72 are positioned so that they are aligned only when the head 20 is in a fully closed position. After the head 20 is rotated to the fully closed position, the locking pin 56 is inserted through bore 70, and the threaded end 53 of the pressure warning/release screw 52 is inserted into a threaded vent bore 73 that extends all the way through the head 20. As the screw 52 continues to be tightened, and the entire assembly 50 is urged downwardly as shown in FIGS. 5 and 6 until the flange 58 compresses the seal 64 against the countersunk surface provided around the opening of the bore 73. Thus, upon full tightening of the pressure warning/release screw 52, the vent bore 73 is sealed shut by the seal 64 and flange 58. The pin 60 holds down the deflector plate 54, which thus holds the locking pin 56 inserted through the bore 70 and projecting into the bore 72 as shown.

By virtue of this arrangement, it can be seen that tightening the pressure warning/release screw 52 not only closes off the fluid or gas from escaping out the vent bore 73, but also positively positions the locking pin 56 through the bore 70 and 72 bore to prevent rotation of the head 20. This provides a positive locking closed of the head 20.

In order to open the head 20, it is first necessary to remove the pressure warning/release screw 54 so that the pin 56 will clear at least the bore 72. Unscrewing the pressure warning screw this far, will necessarily involve releasing the seal of the pressure warning/release screw 54 on the vent bore 73, and thus permits (1) a warning to the user that pressure is present in the form of noticeable escaping gas or fluid and/or (2) the venting of any fluids or gas that are under pressure inside the system near the closure. If the pressure is a residual pressure, the operator may in some embodiments wait until no further escape is observed, and then proceed to open the head 20. However, in some embodiments, the system 50 is not intended to function on a main bleed or blowdown valve. In these embodiments if the pressure is significant, then the operator can re-tighten the screw 52, and proceed with a main bleed operation. In a preferred embodiment, the deflector plate has an L-shaped front 57 as shown, so that any gas or fluid escaping under pressure will tend to be diverted downwardly along the front surface of the head 20, which minimizes the chance of the fluid or gas being sprayed in an undesirable direction.

Once the combined pressure warning release and locking arrangement 50 has been unscrewed sufficiently so that pressure is released, and the locking pin 56 clears the bore 72, the head 20 can then be rotated so that the lugs 18 are no longer obstructing the lugs 23, and then the head 20 can be pulled axially open off the flange 14.

It can be seen from the above, that when the pressure warning/release screw 54 is unscrewed, the deflector plate 54 moves with it, and the locking pin 56 is retracted from its locking position. This releases the cap 20 so that it may be rotated to free to the lugs, at which point separation of the seal surfaces acts as a secondary pressure warning for the operation. Cap 20 can then be withdrawn from the flange 14 and swung fully clear while being supported on the davit 28. A benefit of some embodiments of the invention, is that the locking and safety features can be utilized by a single person without the need for special tools or wrenches. Further, a complete closure of the cap 20 can be assured before the system is pressurized, because in order for the pressure warning screw 52 to be fully seated, the combined pressure and locking mechanism must be fully engaged with the pin 56 in place.

In the preferred embodiment, the length of the threaded portion 53 and the length of insertion of the pin 56 into the bore 72 are dimensioned such that the screw 52 needs to be completely removed from the bore 73 before the pin 56 clears the bore 72. In this embodiment, the pressure warning/release screw 52 does need to be completely removed from contact with the head 20 before opening of the head 20 is possible. This can provide a safety benefit by ensuring that the screw 52 is cleared and does not at all obstruct the vent 73 before the pin 56 is released from the hub bore 72. However, in other embodiments the screw 52 and pin 56 can be dimensioned to not require complete removal of the screw 52 before rotation of the head 20 is permitted. In either case, the screw 52 is rotated at least to a degree that it provides a warning and/or relieves internal pressure before the pin 56 clears the bore 72.

In the preferred embodiment, the vent 73 and associated pressure warning/release screw 52 are provided in the head 20. However, in other embodiments, the vent 73 could extend through part of the flange 14 or the connector 12 and be closed by the screw 52. Also, in the preferred embodiment, the bore 70 does not pass through the lug 23, and the bore 72 extends partially into a lug 18 so it does not pass through lug 18. In other embodiments, the bore 70 could extend through the lug 23, the bore 72 can be positioned on a part of the flange 14 inward of the lug 18. Also, while it is preferred to have the location of the bores 70 and 72 be positioned in the circumference to be within the arcuate lug overlap area, it is possible to put the bores 70 and 72 anywhere around the circumference of the closure assembly.

To close and lock the closure assembly, the user rotates the head 20 to the closed position. Next, the user installs the pressure warning/release and locking system 50 by tightening the pressure warning/release screw 52 fully, which will also seal the vent 73. Due to the configuration of the combined system 50, the pin 56 will extend into the bore 72 sufficiently to prevent rotation of the head 20, and prevent any opening of the head 20 until the pressure warning release screw 52 is again released.

FIGS. 7 through 11 depict an additional preferred embodiment of the present invention. This embodiment includes a combined pressure warning/release and locking system 50 similar to that described above. A characteristic of this embodiment is that a stepped secondary lug 80 is provided on the head 20 adjacent to lug 23. A stop pin 82 is also provided on the flange 14. In FIGS. 7, 8 and 9, the outer ring of the door 20 has been cut away to permit the shape of the lug 23 and secondary lug 80 to be visible.

FIG. 7 shows the head 20 in a closed position with the pressure warning/release screw 52 screwed in. FIG. 8 shows the pressure warning screw 52 having been removed sufficiently so that the lock pin 56 clears the bore 72, permitting rotation of the head 20. FIG. 7 shows the head 20 rotated by a specific angle of rotation until the lug 23 on the head 20 contents to stop pin 82. In FIG. 8, the head 20 has been rotated up until the lug 23 contacts the stop pin 82. At this point the secondary lug 80 is still interfering with its corresponding lug 14. If a sufficient internal pressure is present, the head 20 will be forced outwardly until the secondary lug 80 contacts the lug 14. Thus, in FIG. 8, the head 20 has been rotated to a point where the head 20 will be pushed out partially, but due to the interaction of the lugs 80 and 14, will not forcefully be pushed fully off by a undesireable distance. If no significant internal pressure is present, the operator may simply urge the head axially forward into the position shown in FIG. 9. This is also the position at which the head 20 arrives at if forced out by significant internal pressure.

In FIG. 9, the head has moved axially far enough so that the seal is broken and the pressure has been released. The forward movement of the head 20 permits the lug 23 to clear the stop pin 82. The user then continues to rotate the head 20 into the position shown in FIG. 10. The lug 14 is now fully clear of lugs 23 and 80, and the head 20 may be pulled forward into the position shown in FIG. 11. In FIGS. 7, 8 and 9, the outer ring of the door 20 has been cut away to permit the shape of the lug 23 and secondary lug 80 to be visible.

Various preferred embodiments of the invention may be scaled into any suitable size. Examples of throughbores which may be preferred include diameters from 4 to 12 inches, 4 to 24 inches, with working pressures up to ANSI 300 (740 psi/51.1 bar) and temperatures from −50 F. to 400 degrees F. Diameters up to 12 inches may be even more preferable. Hub 14 can preferably be constructed of forged carbon steel. For example, the hub 14 can be constructed from SA 350-LF 2 material. A benefit of using this material is that it can avoid the need for special field welding techniques or procedures.

The cap 20 may preferably be manufactured from cast carbon steel SA 352-LCB material using 100% radiography in accordance with ASME/ASTM E446 compliance to level 3. The head 20 can be drilled with for example, M16 metric thread or a one half inch UNC thread into which the pressure warning screw 52 locates. The vent hole 73 can be sized large enough to minimize the risk of blockage.

The seal 42 can be a filly molded lip seal available in Nitrile (NBR) and fluoro elastimer material. The seal is preferably located in the head 20 to prevent operational damage, and the use of a lip design prevents metal to metal binding which is often experienced when using O-rings.

Figure 12:
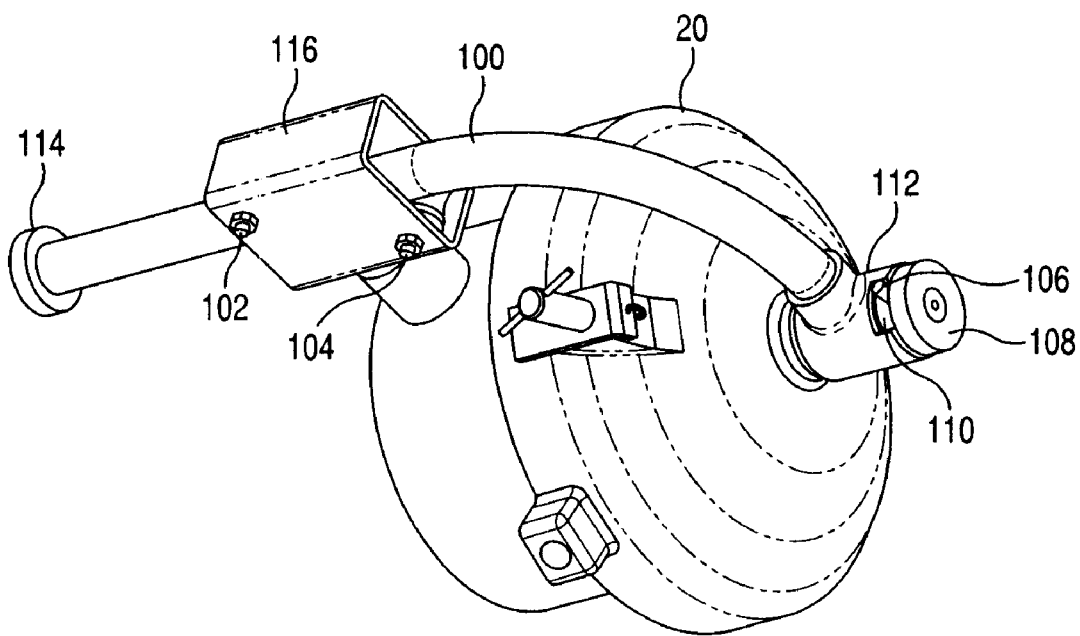
FIG. 12 is a perspective view showing an alternative preferred hinge and davit arrangement for horizontal closures.
Figure 13:
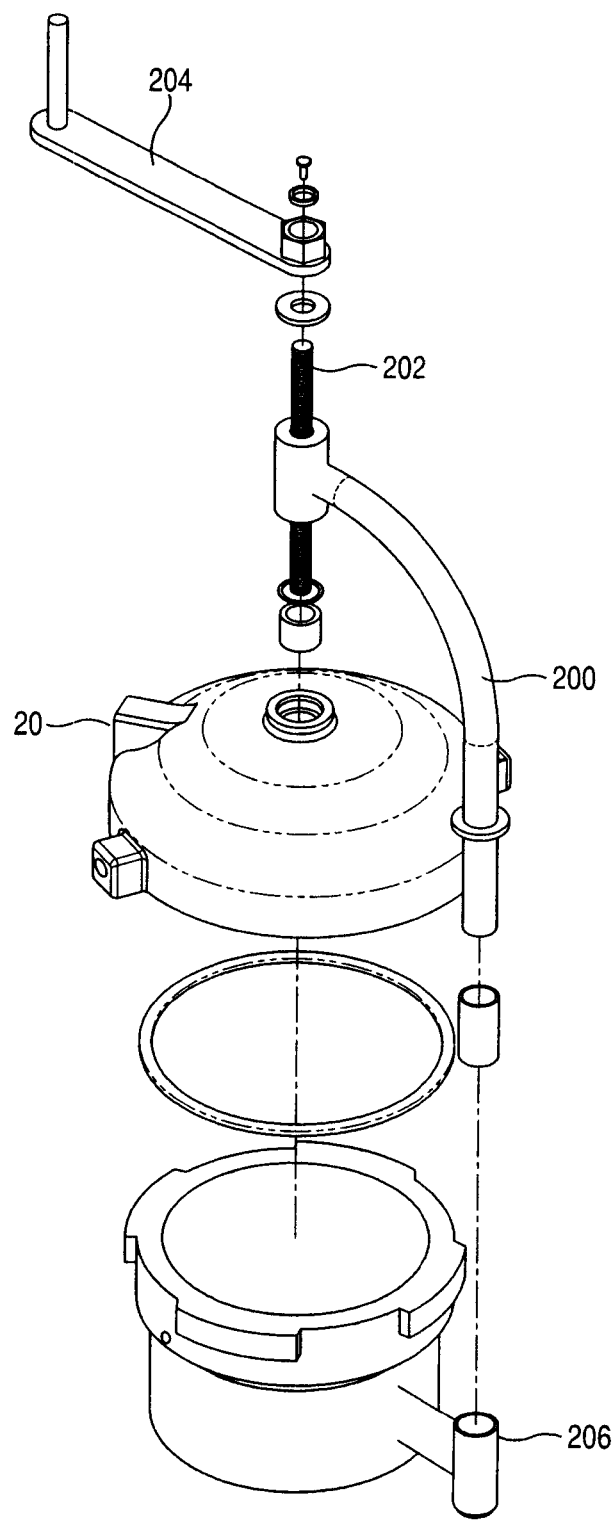
FIG. 13 is a perspective view that shows an alternative preferred hinge and davit arrangement for vertical closures.

A side hinged davit arm arrangement is illustrated in FIGS. 1–11. However, other side hinging arrangements may be used, as well as vertical top opening arrangements. FIG. 12 is perspective view illustrating a presently preferred embodiment of a hinge and davit arrangement used for a horizontal closure. In this embodiment the head 20 is mounted on the davit arm 100 that slides along rollers 102 and 104. A pin 106 extends from a shaft 108 on the head 20 and travels within a slot 110 on a fitting 112 that is at the end of the davit arm 112. This permits the head 20 to be rotated by a desired range for closing and opening the head 20 is opened, it can be moved laterally by the davit arm 100 sliding on the rollers 102 and 104. A stop 114 may be provided at the davit arm to limit the axial travel of the head 20. The rollers 102 and 104 are mounted in a housing 116 that can pivot about a vertical axis, so that when the closure is opened and moved axially off the flange, the head 20 can be swung laterally out of the way to permit access into the opening. FIG. 13 illustrates a preferred arrangement for providing a hinge on a vertically oriented closure. A hinged davit arm 200 extends vertically upward and supports a threaded connection 202 that supports the head 20 vertically. Rotating the handle 204 will lift or lower the head 20, and the davit arm 200 rotates in a hinge bore 206 to move the head 20 out of the way once it has been opened.

A quarter-turn lug arrangement is shown, however, other suitable lug arrangements may be utilized. Further, although the background and preferred embodiments in this application refer to certain industrial processes, the invention is not limited to a particular industrial application, process, material, application or range of sizes.

The many features and advantages of the invention are apparent from the detailed specification, and thus, it is intended by the appended claims to cover all such features and advantages of the invention which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for locking a closure assembly in a closed position, the apparatus comprising:
   a hub having an opening therethrough;
   at least one first lug projecting from the hub;
   a head having at least one second lug projecting from the head, wherein the head is rotatable between an unlocked position where the lugs do not interfere with each other and the head may be removed from the hub, and a closed position where the lugs at least partially overlap each other and interfere with each other so that the head is held in a sealing engagement with the hub; and
   a vent bore passing through at least one of the head and the hub;
   a first locking bore passing through the head;
   a second locking bore extending at least partially into the hub that is aligned with the first locking bore when the head is in the closed position; and
   a seal and lock device including a sealing element that seals the vent bore and a projection that projects into the first and second bores when the head is in the closed position and the sealing element is sealing the vent bore.

2. An apparatus according to claim 1, wherein the seal and lock device includes a plate element, and wherein the sealing element includes by a threaded screw rotatably mounted in the plate element and threadable into the vent bore to seal the vent bore.

3. An apparatus according to claim 2, wherein the projection projects from the plate element.

4. An apparatus according to claim 2, wherein the tightening the screw by a predetermined amount seals the vent bore, and untightening the screw by a predetermined amount retracts the projection from the second bore.

5. An apparatus according to claim 1, wherein the second lug further includes a secondary lug providing a stepped profile.

6. An apparatus for locking a closure assembly in a closed position, the apparatus comprising:
   a hub having an opening therethrough;
   a head removably attachable to the hub via a lug-type holding arrangement and movable between an open position and a closed position, wherein the lug-type holding arrangement further includes a secondary lug arrangement providing a stepped profile;
   a releaseable lock element comprising a projection, the lock element being adapted to be movable between an unlocked position and a locked position, wherein the projection is adapted to project into the lug-type holding arrangement to lock the head in the closed position; and
   a pressure warning/release device movable between a sealed position and a warning position, and which is operably connected to the locking element to withdraw the projection form the lug-type holding arrangement so that the pressure warning/release device must be in the warning/release position in order for the locking element to be unlocked.

7. An apparatus according to claim 6, wherein the pressure warning/release device includes a plate element, a sealing element and a threaded screw rotatably mounted in the plate element.

8. An apparatus according to claim 7 wherein the lock element has a projection that projects from the plate element.

9. An apparatus according to claim 7, wherein tightening the screw by a predetermined amount moves the locking element to the locked position and untightening the screw by a predetermined amount moves the locking element into the unlocked position.

10. An apparatus for locking a closure assembly in a closed position for use with a hub having an opening therethrough and a head removably attachable to the hub via a lug-type holding arrangement, the apparatus comprising:
    a releaseable locking means comprising a projection, wherein the locking means is moveable between an unlocked position and a locked position wherein the projection is adapted to project into the lug-type holding arrangement to lock the head in the closed position; and
    a pressure warning/releasing means moveable between a sealed position and a warning position, said warning means operably connected to the locking means to withdraw the projection from the lug-type holding arrangement so that the pressure warning/releasing means must be in a warning/releasing position in order for the locking means to be unlocked,
    wherein the lug-type arrangement further includes a secondary lug arrangement providing a stepped profile.

11. An apparatus according to claim 10, wherein the pressure warning/releasing means is provided by a threaded screw rotatably mounted in a plate element.

12. An apparatus according to claim 11, wherein the releasable locking means including a projection that projects from the plate element.

13. An apparatus according to claim 12, wherein the tightening the screw by a predetermined amount moves the locking means to the locked position, and untightening the screw by a predetermined amount moves the locking means to the unlocked position.

14. A method for locking a closure assembly in a closed position for use with a hub having an opening therethrough and a head removably attachable to the hub via a lug-type holding arrangement, the method comprising:
    moving a pressure warning/release device from a sealed position to a warning position, the warning/release device operably connected to a locking device that operates to withdraw a projection from the lug-type holding arrangement, so that the pressure warning/release device must be in a warning position in order for the locking device to be unlocked,
    wherein the lug-type further includes a secondary lug arrangement providing a stepped profile.

15. A method according to claim 14, wherein the pressure warning/release device is a screw threadably received in a vent, and the step of moving the pressure warning/release device from the sealed position to the warning position comprises the step of unscrewing the screw.

16. A method according to claim 14, wherein the step of moving the pressure warning/release device from the sealed position to the warning position effects unlocking of the locking device.

17. A method according to claim 15, wherein the step of moving the pressure warning/release device from the sealed position to the warning position effects unlocking of the locking device.

18. A method according to claim 14, further comprising the step of disengaging lugs of the lug-type holding device and removing the head from the hub after the locking device is unlocked.

* * * * *